United States Patent [19]
Narayanan et al.

[11] Patent Number: 6,076,057
[45] Date of Patent: Jun. 13, 2000

[54] UNSUPERVISED HMM ADAPTATION BASED ON SPEECH-SILENCE DISCRIMINATION

[75] Inventors: Shrikanth Sambasivan Narayanan, Riverside, Conn.; Alexandros Potamianos, Scotch Plains; Ilija Zeljkovic, Westfield, both of N.J.

[73] Assignee: AT&T Corp, New York, N.Y.

[21] Appl. No.: 08/861,413

[22] Filed: May 21, 1997

[51] Int. Cl.[7] .................................................. G10L 5/06
[52] U.S. Cl. .......................................... 704/256; 704/233
[58] Field of Search .................................. 704/210, 214, 704/244, 256, 231, 233

[56] References Cited

U.S. PATENT DOCUMENTS

| | | | |
|---|---|---|---|
| 4,481,593 | 11/1984 | Bahler | 381/43 |
| 4,741,036 | 4/1988 | Bahl et al. | 381/43 |
| 5,003,601 | 3/1991 | Watari et al. | 381/43 |
| 5,333,275 | 7/1994 | Wheatley et al. | 704/243 |
| 5,579,436 | 11/1996 | Chou et al. | 704/244 |
| 5,606,644 | 2/1997 | Chou et al. | 704/244 |
| 5,617,486 | 4/1997 | Chow et al. | 704/244 |
| 5,649,057 | 7/1997 | Lee et al. | 704/256 |
| 5,710,864 | 1/1998 | Juang et al. | 704/256 |
| 5,715,367 | 2/1998 | Gillick et al. | 704/244 |
| 5,717,826 | 2/1998 | Setlur | 704/256 |
| 5,727,124 | 3/1998 | Lee et al. | 395/2.42 |
| 5,737,486 | 4/1998 | Iso | 704/256 |
| 5,778,340 | 7/1998 | Hattori | 704/244 |
| 5,778,341 | 7/1998 | Zeljkovic | 704/256 |
| 5,778,342 | 7/1998 | Erell et al. | 704/256 |

OTHER PUBLICATIONS

Wilpon et al. Automatic Recognition of Keywords in Unconstrained Speech Using Hidden Markov Models. IEEE Transaction on Signal Processing. pp. 1870–1878, Nov. 1990.

Mikkilineni et al. Discriminative Training of A Connected Digit Recogizer with Fixed Filler Models and its Applciation to Telephone Network Service Systmes. IEEE, May 1996.

De Souza. A Statistical Approach to the Design of an Adapative Self–Normalizing Silence Detector. IEEE Transactions on Acoustics, Speech and Signal Processing. No. 3, Jun. 1993.

de Veth et al. Limited Paramter Hidden Markov Models for Connected Digit Speaker Verfication Over Telephone Channels. IEEE, Apr. 1993.

McDonough et al. An Approach to Speaker Adaption based on Analytic Functions. IEEE. 721–724, Aug. 1994.

Matsui et al. N–Best–Based Instantaneous Speaker Adaption Method for Speech Recognition. 973–976, 1996.

Leggetter et al. Maximum likelhood linear regression for speaker adaptation of continuous density hiddent markov Models. 171–185, 1995.

Cox et al. Unsupervised Speaker Adaptation by Probabilistic Spectrum Fitting. IEEE. 1989.

Chou et al. Minimum error rate Training Based on N–Best String Models. IEEE. 652–655, 1993.

Lawrence R. Rabiner et al., "A Segmental k–Means Training Procedure for Connected Word Recognition", *AT&T Technical Journal,* vol. 65, Issue 3, May/Jun./ 1986, pp. 21–31.

W. Chou et al., "Minimum Error Rate Training Based on N–Best String Models", *IEEE,* 1993, pp. II–652–II–655.

Lawrence Rabiner et al., *Fundamentals of Speech Recognition,* Prentice Hall, pp. pp. 69–139 and 200–209.

*Primary Examiner*—Emanuel Todd Voeltz
*Assistant Examiner*—M. David Sofocleous

[57] ABSTRACT

An unsupervised, discriminative, sentence level, HMM adaptation based on speech-silence classification is presented. Silence and speech regions are determined either using a speech end-pointer or the segmentation obtained from the recognizer in a first pass. The discriminative training procedure using a GPD or any other discriminative training algorithm, employed in conjunction with the HMM-based recognizer, is then used to increase the discrimination between silence and speech.

12 Claims, 4 Drawing Sheets

| COMPETING STRING GENERATION | ADAPTATION MODE | WORD ERROR (%) | | | |
|---|---|---|---|---|---|
| | | TOTAL | SUB | DEL | INS |
| NONE (BASELINE) | N/A | 1.25 | 0.8 | 0.1 | 0.4 |
| ACOUS. DRIVEN INS | LONG-TERM | 1.08 | 0.8 | 0.1 | 0.2 |
| BLIND INS | LONG-TERM | 1.23 | 0.9 | 0.2 | 0.2 |
| ACOUS. DRIVEN INS | ISTANTANEOUS | 1.16 | 0.7 | 0.1 | 0.3 |
| BLIND INS | ISTANTANEOUS | 1.17 | 0.7 | 0.1 | 0.3 |

*FIG. 6*

| COMPETING STRING GENERATION | ADAPTATION MODE | WORD ERROR (%) | | | |
|---|---|---|---|---|---|
| | | TOTAL | SUB | DEL | INS |
| NONE (BASELINE) | N/A | 12.20 | 1.4 | 0.0 | 10.8 |
| ACOUS. DRIVEN INS | LONG-TERM | 2.11" | 1.3 | 0.0 | 0.8 |
| BLIND INS | LONG-TERM | 15.3 | 12.5 | 0.0 | 2.9 |
| ACOUS. DRIVEN INS | ISTANTANEOUS | 7.56 | 1.3 | 0.0 | 6.1 |
| BLIND INS | ISTANTANEOUS | 7.8 | 1.3 | 0.0 | 6.4 |

*FIG. 7*

UNSUPERVISED HMM ADAPTATION BASED ON SPEECH-SILENCE DISCRIMINATION

BACKGROUND OF THE INVENTION

1. Field of Invention

The invention relates to an unsupervised, discriminative, sentence level, Hidden Markov Model (HMM) adaptation based on speech-silence classification.

2. Description of Related Art

A large part of the speech recognition literature deals with the problems caused to real-world recognition systems by noise, distortion or variability in the speech waveform. Various algorithms have been proposed to deal with these problems, such as cepstral mean normalization, maximum likelihood (ML) cepstrum bias normalization, ML frequency warping and ML linear regression. Apart from these transformation-based techniques that produce good results with a limited amount of adaptation data, the acoustic models can be retrained using maximum a posteriori (MAP) adaptation. MAP adaptation typically requires a large amount of adaptation data. Algorithms have been proposed for updating groups of HMM parameters or for smoothing the re-estimated parameter values, such as field vector smoothing, classification tree or state-based clustering of distributions. Parallel model combination (PMC) has also been used to combat both additive noise distortion and multiplicative (channel) distortion.

Typically the aforementioned algorithms perform well for simulated data, i.e., when additive or multiplicative distortion is added to the speech signal in the laboratory, but not equally well in field trials where a multitude of sources with time-varying characteristics can distort the speech signal simultaneously. In many cases, very little data are available for adaptation. Further, the adaptation data might not be transcribed. It has been shown in numerous publications that discriminatively trained HMMs improve recognition accuracy. However, in the training process, it is assumed that the linguistic context of the utterances is known. Unsupervised adaptation using very few utterances is a very difficult problem because there are no guarantees that the adapted parameters will converge to globally optimum values.

In addition, acoustical mismatch between training and testing conditions results in significant accuracy degradation in HMM-based speech recognizers. Careful inspection of the recognition errors shows that word insertion and substitution errors often occur as a result of poor recognition scores for acoustic segments with low-energy phones. The underlying problem is that channel and noise mismatch have relatively greater influence on low-energy (low-amplitude) portions of the speech signal. Various blind deconvolution and bias removal schemes address this problem in the context of the general mismatch of the whole speech signal. Thus, the focus must lie on these critical regions of the acoustics speech signal, i.e., the regions where the signal characteristics of the background (representing non-speech segments) and the speech signal (typically unvoiced portions) are similar.

Thus, an effective way to adapt HMM parameters, in an unsupervised mode, during the recognition process in a way that increases discrimination between the background model and speech models for a particular sentence or set of sentences, is sought.

SUMMARY OF THE INVENTION

A system and method is provided for unsupervised adaptation of state sequences for discriminating between speech and silence. In particular, it may be a system and method for improving the recognition of silence regions so that these silence regions can be used for discriminative training, and may include segmenting the input utterance into speech and silence regions, generating competing strings and aligning the competing strings to the segmented silence regions, enhancing separation between correct and competing strings using a discriminative training algorithm to generate adapted state sequences, and performing optimal decoding on the input utterance using the adapted state sequences.

BRIEF DESCRIPTION OF THE DRAWINGS

The invention will be described with reference to the following drawings in which like reference numerals refer to like elements and wherein:

FIG. 6 is a table showing recognition performance on AT&T Service Trial I with HMM adaptation under matched training and testing conditions; and FIG. 7 is a table showing recognition performance on AT&T Service Trial II with HMM adaptation under mismatched testing and training conditions.

DETAILED DESCRIPTION OF PREFERRED EMBODIMENTS

The present invention relates to efficient decoding of input signals. Although the invention is described in the context of speech recognition, it has broader applications. For example, the invention may be useful in other communication, data and information systems that employ statistical modeling. For clarity of explanation, embodiments of the present invention are presented herein as functional blocks. The functions that these blocks represent may be provided through the use of either shared or dedicated hardware, including, but not limited to, hardware capable of executing software. Furthermore, the use of the term "processor" should not be construed to refer exclusively to hardware that is capable of executing software. Some embodiments may comprise both hardware such as a digital signal processor (DSP) and software for performing the operations discussed below. Very large scale integration (VLSI) hardware embodiments of the present invention, as well as hybrid DSP/VLSI embodiments, may also be provided.

Figure 1:
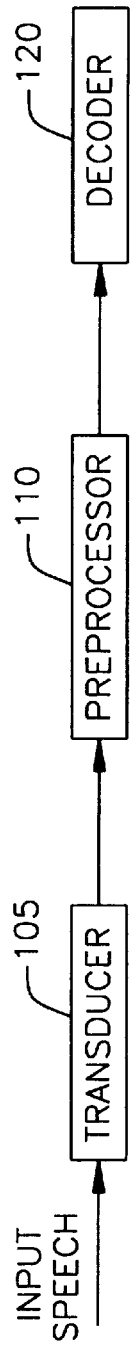
FIG. 1 is a functional block diagram of a speech recognition system.
Figure 3:
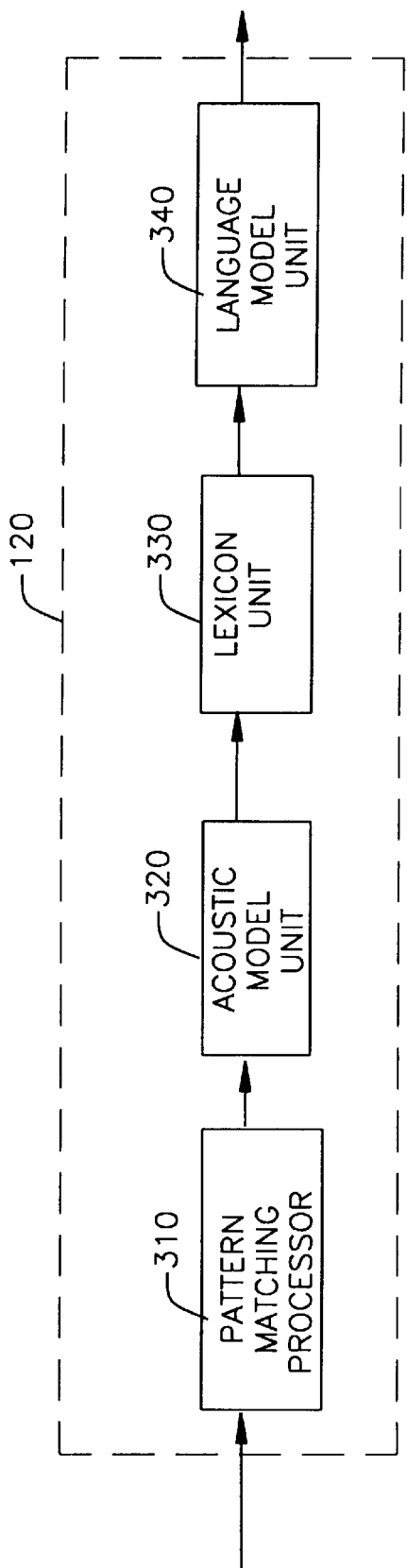
FIG. 3 is a functional block diagram of the decoder of the speech recognition system of FIG. 1.

FIG. 1 is a functional block diagram of the speech recognition system 100 in accordance with the present invention. Speech is converted to an analog signal using a transducer 105, such as a microphone. A preprocessor 110 receives the speech signal and converts it into a digital form embodying speech features that facilitate subsequent recognition by decoder 120. The decoder 120 transforms the digital signal into an appropriate word or sequence of words. Typically, the decoder 120 is constrained by a set of acoustic models that correspond to basic units of speech (e.g., phonemes, syllables and words), a lexicon that defines the vocabulary of the decoder in terms of the basic units, and a language or grammar model that specifies allowable sequence of vocabulary terms. These functional units are illustrated in FIG. 3 and discussed below.

Figure 2:
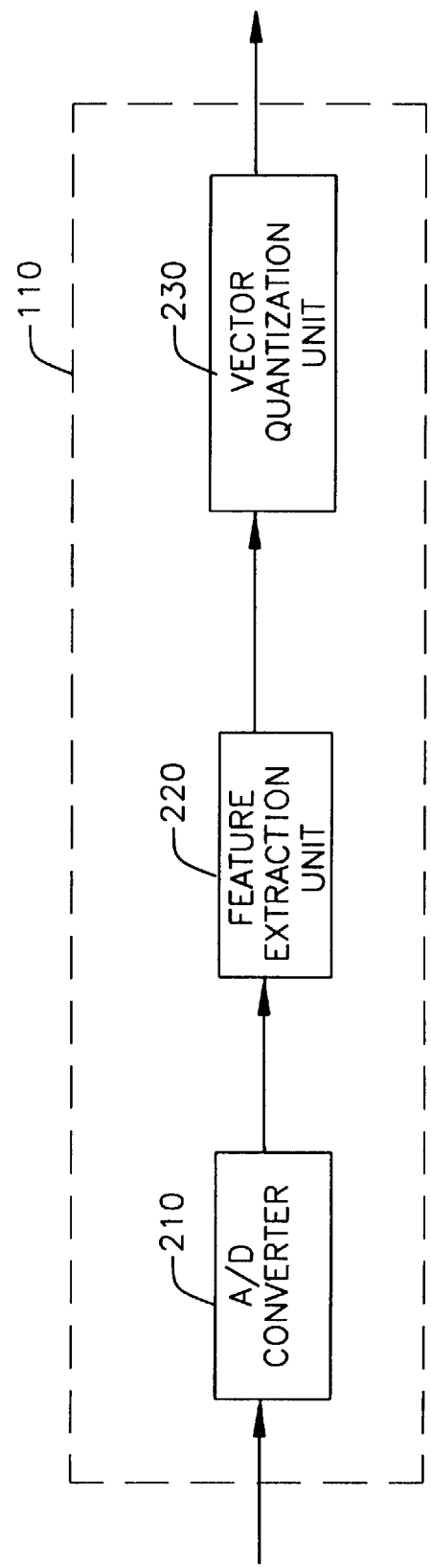
FIG. 2 is a functional block diagram of a signal preprocessor of the speech recognition system of FIG. 1.

FIG. 2 is a detailed functional block diagram of preprocessor 110. Preprocessor 110 comprises, e.g., an analog to digital (A/D) converter 210, a feature extraction unit 220, and a vector quantization unit 230.

A/D converter 210 receives input analog speech waveform signals and transforms them into corresponding digital signals. Illustrative A/D converters may include an anti-aliasing filter and a high frequency preemphasis filter to spectrally flatten the analog signal. The signal is then digitized, for example, to 11 or 12 bits at a rate from approximately 6 kHz to 20 kHz. In general, the sampling rate is about twice the bandwidth of the communication channel. For example, the sampling rate of 8 kHz is the standard for a conventional telecommunication channel having a bandwidth of 4 kHz. The output of A/D converter 210 is a digital representation of the speech signal. This signal can be described as the product of a source spectrum, i.e., input analog speech signal, and the transfer function of the A/D converter's filters.

The feature extraction unit 220 provides a parametric representation of the speech signal. Conventional techniques such as a filter bank, Fourier transformation, Linear Predictive Coding (LPC), and/or Cepstral Analysis may be employed to obtain the parameters. Such techniques are described, e.g., in *Fundamentals of Speech Recognition*, L. R. Rabiner and B. H. Juang, Prentice Hall, 1993, pgs. 69–139 and 200–209 the subject matter of which is incorporated herein by reference. The set of parameters, referred to as a "feature vector" (o), is computed from a frame of speech data defined by windowing a certain number of samples of the signal. Each frame represents an observation. Typically, the frame rate is less than the window width, i.e., overlapping frames, in order to avoid aliasing.

Typically, approximately 10–20 basic features are included, along with their first and second derivatives. Accordingly, the input voice signal is transformed into a sequence of feature vectors constituting, e.g., an observation sequence, $o=(o_1, o_2, \ldots o_n)$, having n number of feature vectors. The optional vector quantization unit includes a "codebook" listing speech labels that are feature vectors which have been computed by conventional training techniques such as k-mean segmentation (as described in Rabiner et al., "A Segmental k-means Training Procedure For Connected Word Recognition Based on Whole Word Reference Patterns", *AT&T Tech. Journal*, Vol. 65, No. 3, p. 21–31, May 1986, the subject matter of which is incorporated herein by reference).

FIG. 3 is a detailed functional block diagram of decoder 120, which transforms the sequence of feature vectors received from preprocessor 110 to a sequence of speech units. As shown, decoder 120 may include a pattern matching processor 310, an acoustic model unit 320, a lexicon unit 330, and a language model unit 340.

Acoustic model unit 320 stores an inventory of speech units, such as phonemes, words, syllables, or other units recognized by decoder 120, each represented by a Hidden Markov Model (HMM), which has been generated by a training processor (not shown). As mentioned previously, a HMM is a statistical technique for modeling unknown processes.

In general, each HMM may be represented by a state diagram having N number of states, vectors defining transitions between certain pairs of those states, probabilities that apply to state-to-state transitions, a set of probabilities characterizing M number of observed output symbols within each state, and initial conditions. A probability density function (pdf) is associated with each state.

An illustrative embodiment to the acoustic model unit stores speech units as well as background silence as left-to-right HMMs.

Figure 4:
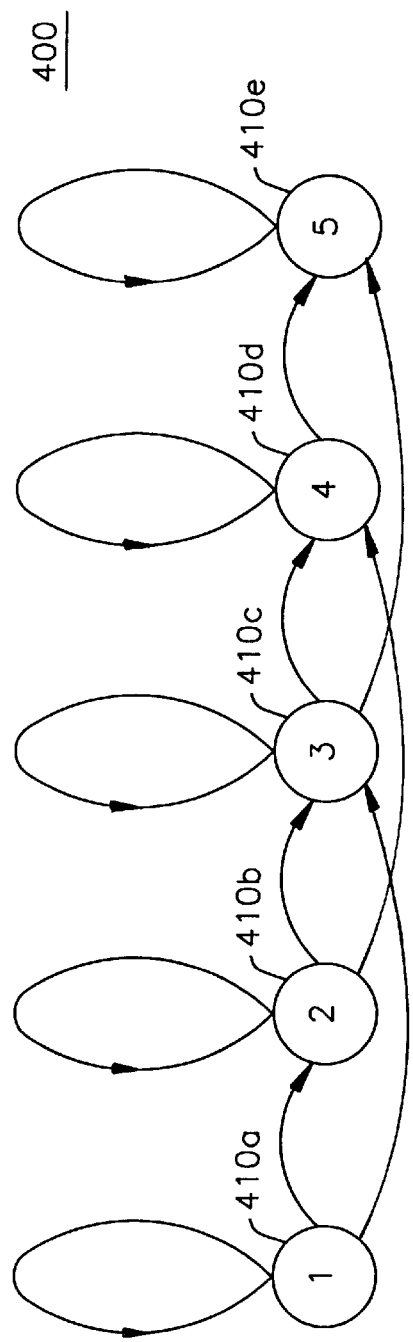
FIG. 4 is an illustrative example of a state diagram corresponding to a left-to-right Hidden Markov Model.

FIG. 4 illustrates an example of a state diagram representing a left-to-right HMM for modeling words or subwords. As previously described, words or subwords can be modeled as a sequence of syllables, phonemes, or other speech sound units that have temporal interpretation. Typically, each unit is represented by one or more states within the state diagram.

Illustratively, state diagram 400 contains 5 states, 410a–410e, to model a target word. As can be seen, the arrows of the state diagram, which correspond to the feature vectors, flow to states from left to right.

The state observation density function or pdf for state j of the state diagram $b_j(o)$, is represented as a mixture of a finite number of Gaussians of the form:

$$b_j(o) = \sum_{m=1}^{M} c_{mj} N(o, u_{mj}, U_{mj})$$

where o is the vector being modeled, $C_{mj}$ is the mixture weight for the mth component in state j, and N represents a multivariant normal density. Typically, N is assumed to be Gaussian with mean vector $u_{mj}$ and covariance matrix $U_{mj}$ for the mth mixture component in state j. The features of the observation vector, as well as their first and second derivatives, are derived from conventional spectral LPC, Cepstral or other analyses.

The HMM parameters c, u, and U are estimated from labeled speech that has been obtained from the training processor using a segmented k-means algorithm, e.g., as disclosed in Rabiner, et al., "A Segmental k-means training Procedure for Connected Word Recognition Based on Whole word Reference Patterns," *AT&T Tech, Journal.*, vol. 65, No. 3, pp. 21–31, May 1986, the subject matter of which is incorporated herein by reference. State boundaries in each training token are determined, for example, by optimal (Viterbi decoding) alignment of the current model with the token.

Pattern matching processor 310 (FIG. 3) receives the sequence of observation vectors, $O=(o_1, o_2, \ldots o_n)$, representing an unknown speech utterance and searches the network of HMMs stored in acoustic unit 320 to find a match. As previously discussed, the states of an HMM contain M number of outputs and each output has a different probability as defined by the pdf. As such, different HMMs can generate sequences with outputs matching that of the input observation sequence, each with a different probability.

The goal of the search process is to return a number of most-likely state sequences, $Q=(q_1, q_2, \ldots q_n)$, that generated the sequence of observation vectors, as disclosed in Chou, et al., "Minimum Error Rate Training Based on N-Best String Models," Proc. ICASSP 1993, Vol. 2, pp. 652–665. A Dynamic Programming (DP) technique is used to find the most-likely state sequences. The DP determines the likelihood score or accumulated probability of the most-likely state sequence in each HMM for an input observation sequence.

The goal of the discriminative model training algorithm is to find a model set that optimally distinguishes the observation sequences corresponding to correct class models and those of N competing class models by maximizing the mutual information between the observation sequence O in the words or strings of that class. The misclassification measure $$d(O, \Lambda) = -g(O, S_u, \Lambda) + \log\left\{\frac{1}{N-1}\sum_{S_k \neq S_u} e^{s(O,S_k,\Lambda)\eta}\right\}^{\frac{1}{\eta}}$$

uses the discriminant function $$g(O,S_k,\Lambda)=\log f(O,\theta_{Sk},S_k|\Lambda)$$

which is defined in terms of the loglikelihood score $f$ on the optimal state sequence $\theta_{sk}$ (given the model set $\Lambda$) for the $k^{th}$ best string, $S_k$. The discriminant function for the transcribed training string $S_u$ is $g(O,S_u,\Lambda)$. The model loss function for string error rate minimization, $l(O, \Lambda)=1/(1+\exp(-\gamma d(O, \Lambda))$, where $\gamma$ is a positive constant, is solved using gradient descent algorithm.

The behavior of the background is the most volatile element of the acoustic speed signal. Although HMM-based recognizers often confuse the background with valid speech segments, thereby producing insertion errors, portions of the background (silence) regions can be identified with fairly high accuracy using simpler but most robust techniques that are based on signal power, zero-crossing, amplitude distribution, etc.

High degree of certainty in determining silence regions and the use of only these regions to adapt both speech and silence models makes this kind of unsupervised adaptation both accurate and efficient.

Figure 5:
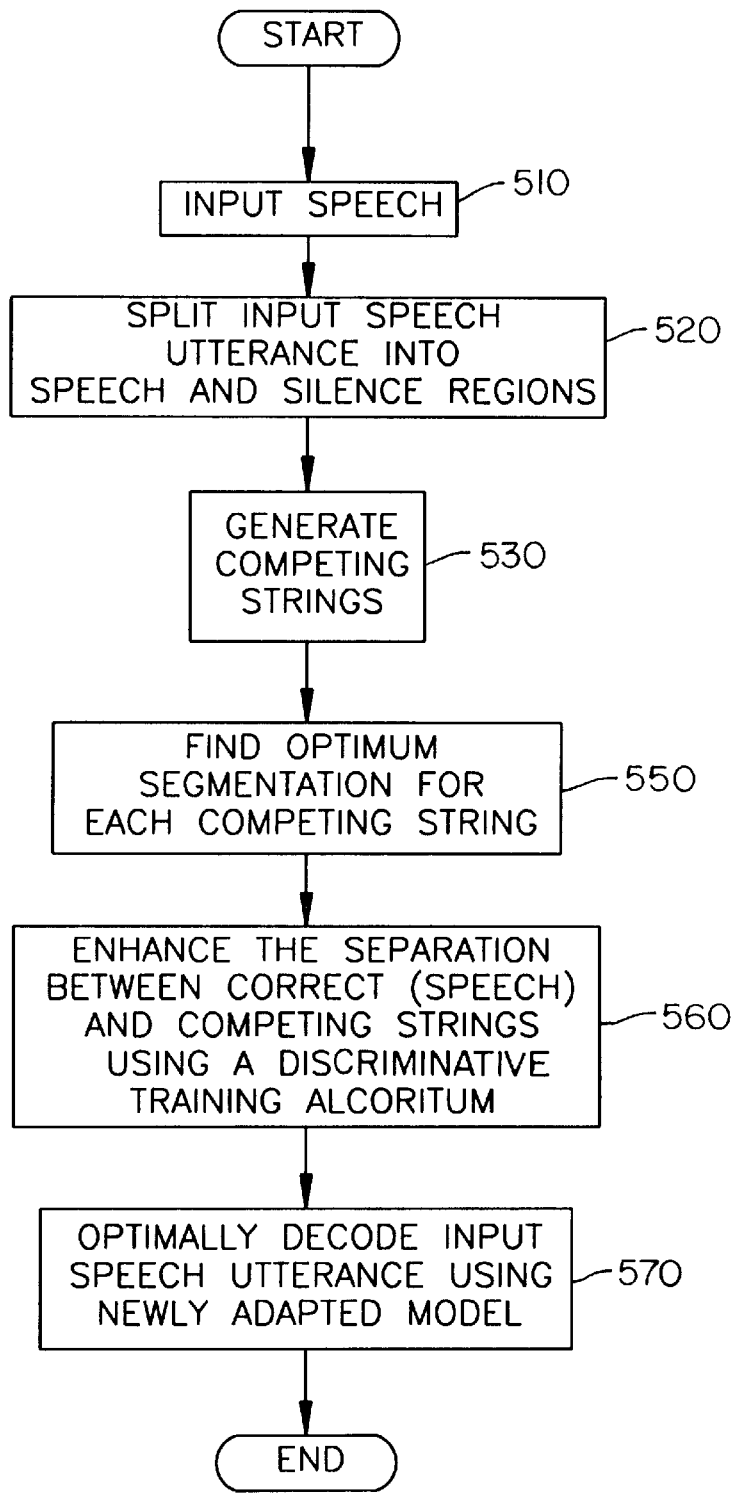
FIG. 5 is a flow diagram illustrating the speech-silence discrimination processing.

For example, the method of distinguishing between speech and silence regions includes the algorithm shown in FIG. 5. Initially, at step 520, the input utterance 510 is split into speech and silence regions. If more than one background HMM is used, optimal or Viterbi decoding of the silence regions using just background HMMs, is performed.

Next, at step 530, competing strings are generated, for example, by either acoustically-driven insertion incentives or by using a rule-based insertion strategy. At step 550, the competing strings are optimally decoded to find the optimum segmentation. A discriminative training algorithm is then used at step 560 to adapt the HMM's in order to enhance separation between correct and competing strings. Following the adaptation procedure, once the separation has been enhanced between correct and competing strings, optimal decoding or recognition is performed on the whole utterance at step 570 using the newly adapted HMMs and any prescribed grammar.

There are many ways to implement the above algorithm. Speech-silence segmentation (step 520) may be obtained by a simple preprocessing step before the recognition process begins. In the current implementation the speech-silence segmentation is performed by the recognizer in the first pass using the initial HMMs, a grammar, but with no insertion penalties. This is assumed to be the "correct string".

Competing strings (step 530) are produced in two alternative ways:
(a) Acoustically driven insertion: A negative insertion penalty (insertion incentive) is used to decode the N-best competing strings (encouraged internal insertion).
(b) Blind external insertion: Eleven competing strings (for digit recognition tests) are generated: each digit is added before and after the initially recognized string, generating one competing string (forced external insertion). For speech recognition tasks other than digit recognition, appropriate rule-based blind insertion rules may be used.

The discriminative training (step 560) is performed by using the minimum string-error training algorithm using N competing string models.

Finally, the second-pass recognition is performed with the adapted models using the Viterbi decoding algorithm (step 570).

Thus, a novel HMM adaptation method based on speech-silence discrimination is presented. The main contributions are:
The exclusive use of signal portions declared by the algorithm as silence segments (i.e., unsupervised modality) for adapting both silence and some/all speech models in a way that results in improved speech-silence discrimination in the new model set.
Automatic competing string generation by providing insertion incentives, inserting words that are naturally prone to acoustic confusion with background.
Unsupervised adaptation using a gradient descent or other discriminative training algorithm that assures convergence.
Results show that competing strings directly provided by the recognizer by employing insertion incentives give the most useful set of data for speech-silence discrimination, and yields the best overall error rate improvements even under mismatched training and testing conditions.

As an example of this method, speech units (words and subwords) as well as background silence are modeled by first order, left-to-right HMMs with continuous observation densities. The observation vector consists of 39 features: 12 LPC derived cepstral coefficients, dynamically normalized energy, as well as their first and second derivatives. Eleven digits, including "oh" and "zero", were used in the evaluation task. Each digit was modeled with either 20 or 15 state HMMs, with 16 Gaussian mixtures. Speech background (silence) is modeled with a single state, 128 Gaussian mixture HMM. The HMMs were trained using data extracted from speech data collected over the telephone network (16089 digit strings).

In the recognition process, the sequence of observation vectors from an unknown speech utterance are matched against a set of stored hidden Markov models representing speech units. A search network is generated by a finite state grammar that describes the set of valid strings. The network search algorithm returns the single most likely sequence of speech units. The search procedure is a Dynamic Programming (DP) algorithm (Viterbi decoding) where the goal is to find a valid state sequence with the highest accumulated state log-likelihood [10].

The algorithm was tested on speech data collected from two AT&T service trials. Trial I data, consisting of 10768 16-digit strings, represented matched training and testing conditions. On the other hand, no data from Trial II were represented in training. Moreover, Trial II data consist only of single digits (a total of 2159 utterances). It should be pointed out that isolated digits represented only a small portion of the training database.

FIG. 6 and FIG. 7 summarize the recognition results for various testing conditions: Results are compared for the two methods of competing string generation (N-best competing strings by acoustically-driven insertion using insertion incentives and blind external insertion by forced initial and final digit appending), with each case repeated with and without resetting the models to the baseline class for each new string input. The baseline results correspond to no model adaptation.

Under reasonably matched training and testing conditions, insertion errors are reduced in all test cases when adaptation is used. The best results are obtained for the case that uses competing strings generated through insertion incentives. Moreover, as expected, long-term adaptation (using all available utterances for adaptation) performs better than instantaneous adaptation (i.e., a single utterance is used to adapt the HMMs). On the other hand, although the blind insertion method has a similar effect on insertion errors, it is accompanied by increased substitution and deletion errors, particularly in the long-term adaptation case, suggesting divergence in the adapted models with increasing adaptation data.

The unusually high number of insertion errors in the baseline results for Trial II data is attributed to the structural mismatch between the training data and this particular test set which is composed entirely of isolated digits. Instantaneous adaptation gives about 36–38% improvement in word error rates for both methods of competing string generation. For long-term adaptation, however, the blind insertion method of competing string generation yields poorer performance than the baseline while the acoustically-driven insertion method yields more than 80% improvement in word error rate. A closer analysis of the results shows that there is improvement in insertion errors, there is significant increase in substitution errors for the blind insertion method. This result further supports that model divergence (instability) with increasing adaptation data is a potential pitfall when blind insertion is used for competing string generation.

While the invention has been particularly shown and described with reference to various embodiments, it will be recognized by those skilled in the art that modifications and changes may be made to the statistical modeling methods herein described without departing from the spirit and scope thereof as defined by the appended claims and their full scope of equivalents.

What is claimed is:

1. A method for discriminating between speech and background regions, comprising:

segmenting an input utterance into speech and background regions without knowledge of the lexical content of the input utterance to create a segmented input string;

introducing insertion errors into the background regions that are error prone to generate error laden background strings;

statistically modeling the segmented input string and the error laden background strings using a discriminative training algorithm to generate a model with adapted parameters;

decoding the input utterance using the model with the adapted parameters; and outputting a recognized string based on the decoding step.

2. The method as recited in claim 1, wherein the model with adapted parameters is generated using Hidden Markov Models.

3. The method as recited in claim 1, wherein the segmenting step uses Viterbi decoding.

4. The method as recited in claim 1, wherein the discriminative training algorithm is a minimum string-error training algorithm using N competing string models.

5. The method as recited in claim 1, wherein the decoding step uses Viterbi decoding.

6. The method as recited in claim 1, wherein the statistically modeling step uses a Generalized Probabilistic Descent algorithm.

7. A system for decoding of speech information comprising:

means for segmenting an input utterance into speech and background regions without knowledge of the lexical content of the input utterance to create a segmented input string;

means for introducing insertion errors into the background regions that are error prone to generate error laden background strings;

means for statistically modeling the segmented input string and the error laden background strings using a discriminative training algorithm to generate a model with adapted parameters;

means for decoding the input utterance using the model with the adapted parameters; and means for outputting a recognized string based on the decoded input utterance.

8. The system as recited in claim 7, wherein the means for statistically modeling generates the model with adapted parameters using Hidden Markov Models.

9. The system as recited in claim 7, wherein the means for segmenting the input utterances into the segments uses Viterbi decoding.

10. The system as recited in claim 7, wherein the discriminative training algorithm includes a minimum string-error training algorithm using N competing string models.

11. The system as recited in claim 7, wherein means for decoding the input utterance uses Viterbi decoding.

12. The system as recited in claim 7, wherein the means for statistically modeling uses a Generalized Probabilistic Descent algorithm.

* * * * *